July 9, 1963 R. L. NEVIN 3,096,583
FOOD PRODUCT SLICING MACHINE
Filed Oct. 25, 1962 4 Sheets-Sheet 1

INVENTOR.
ROBERT L. NEVIN
BY Clark + Ott
ATTORNEYS

July 9, 1963 R. L. NEVIN 3,096,583
FOOD PRODUCT SLICING MACHINE
Filed Oct. 25, 1962 4 Sheets-Sheet 4

INVENTOR.
ROBERT L. NEVIN
BY Clark+Ott
ATTORNEYS

United States Patent Office 3,096,583
Patented July 9, 1963

3,096,583
FOOD PRODUCT SLICING MACHINE
Robert L. Nevin, New York, N.Y., assignor to Helm Machine Products, Inc., New York, N.Y., a corporation of New York
Filed Oct. 25, 1962, Ser. No. 233,045
6 Claims. (Cl. 31—25)

This invention relates to a food slicing machine and while not limited thereto, the invention has particular reference to a slicing machine for slicing dairy products such as a loaf of cheese and the like into thin slices.

An object of the invention is to provide an improved construction of slicing machine for simultaneously slicing an entire loaf of a dairy product into a large number of thin slices.

Another object of the invention is to provide a slicing machine which slices the product into thin slices without crumbling or breaking the slices.

Another object of the invention is to provide a slicing machine utilizing cutter wires which engage the product in continuously changing angular relation for effecting a clean cutting action through the product.

Still another object of the invention is to provide a slicing machine of said character in which the cutting wires in cutting through the food product move from one angular relation to oppositely disposed angular relation and from said oppositely disposed angular relation to substantially horizontal relation.

Slicing machines utilizing wires have been employed for slicing food products in which the wires move through the product uniformly in one direction so as to sever the product into slices by compression of the wires thereagainst. This type of cutting machine has the disadvantage that a food product such as a loaf of cheese could be cut only into relatively thick silces without breaking or crumbling thereof. The present invention overcomes the aforesaid objections and disadvantages by imparting to the wires as the same move through the product continuously changing angular movement from one inclined or canted relation with reference to the food product to oppositely disposed inclined or canted relation and from said oppositely disposed canted relation to substantially horizontal relation whereby a multiplicity of thin slices are cut without breaking or crumbling thereof.

The invention includes a table affixed to a base for receiving a food product in supported relation thereon and with a cutter head consisting of a frame having a multiplicity of wires arranged in a common plane and disposed above the food product for cutting the same into a multiplicity of slices with the downward movement of the wires through the food product. Drive means operatively connected with racks to which the head is pivotally connected are provided for imparting reciprocatory movement to the head with means for effecting turning movement of the head in continuously changing angular relation from one angular relation with reference to the food product to oppositely disposed angular relation and to substantially horizontal relation with the downward movement of the head.

With the foregoing and other objects in view, reference is now made to the following specification and accompanying drawings in which the preferred embodiment of the invention is illustrated.

Figure 1:
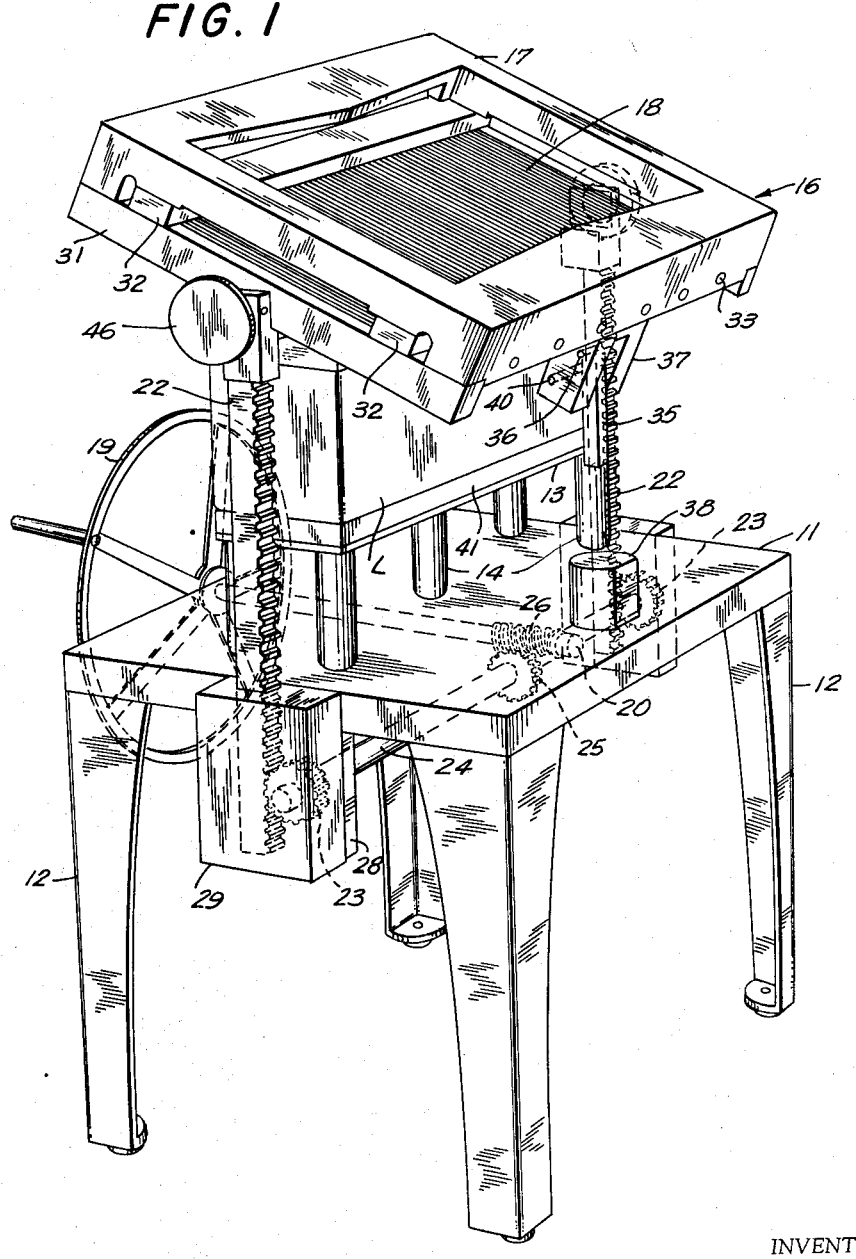
FIG. 1 is a perspective view of a slicing machine constructed in accordance with the invention and illustrating a loaf of cheese in position thereon for cutting into a multiplicity of slices.
Figure 2:
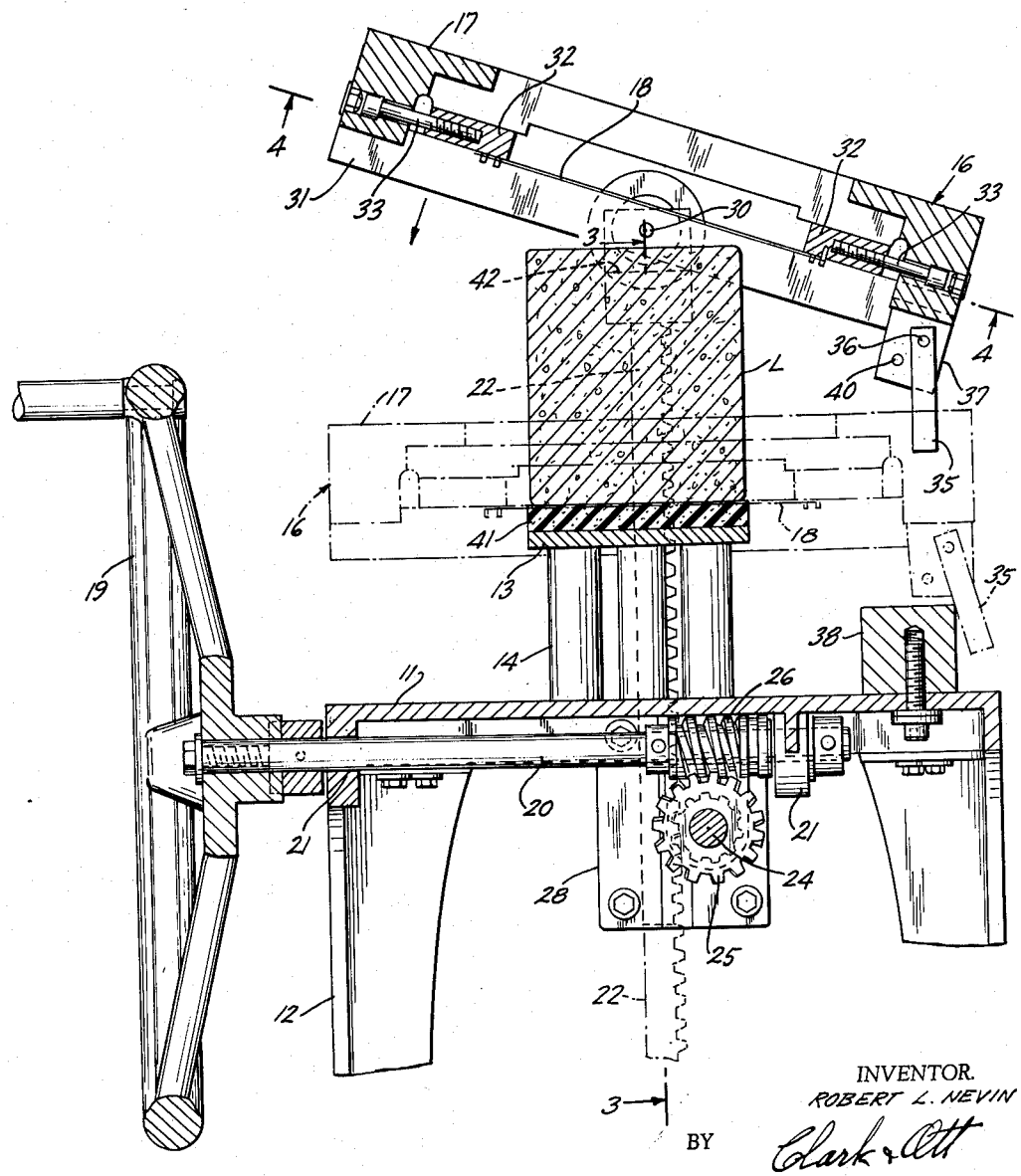
FIG. 2 is a transverse medial sectional view with the legs and manipulating handle partly broken away.
Figure 3:
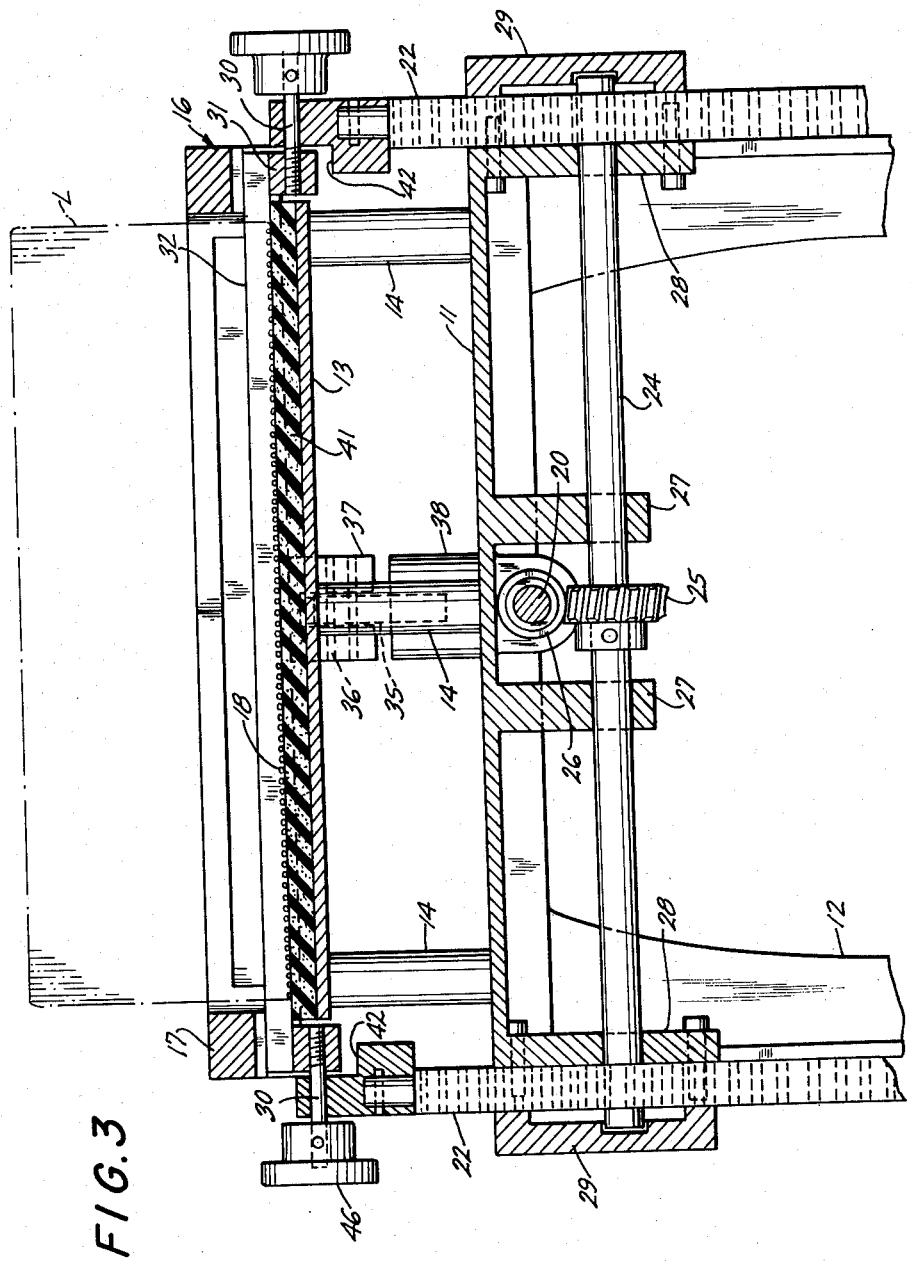
FIG. 3 is a longitudinal sectional view taken approximately on line 3—3 of FIG. 2.
Figure 4:
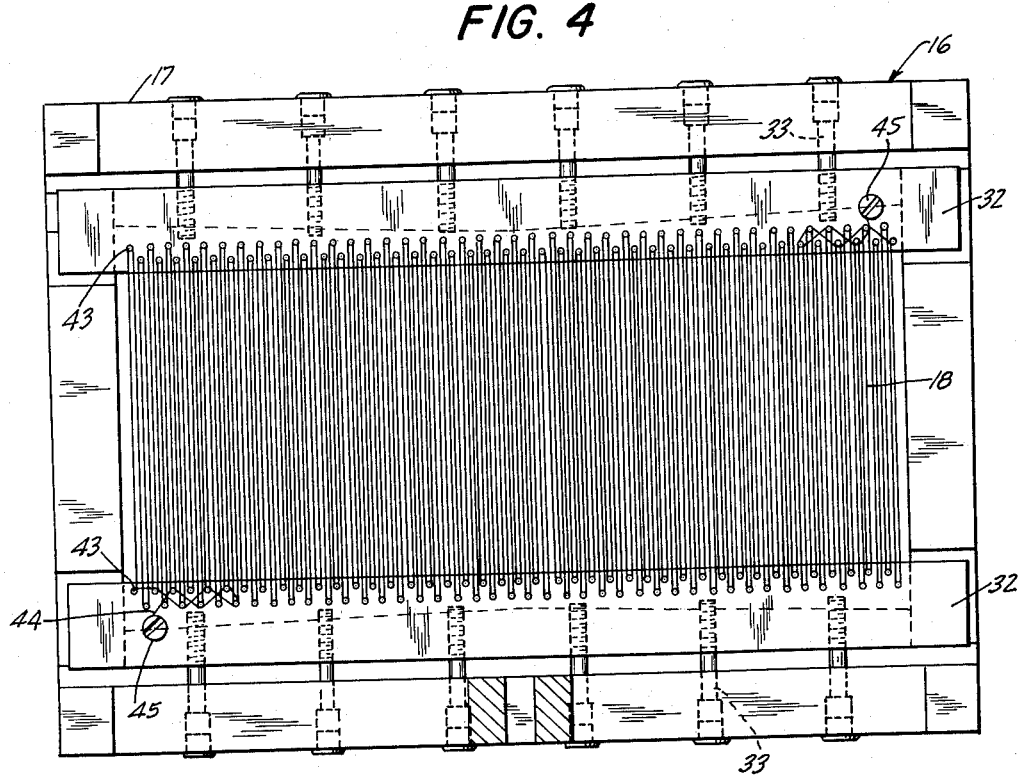
FIG. 4 is an underside view of the head taken approximately on line 4—4 of FIG. 2.

Referring to the drawings, the invention is illustrated in its application to a cutting machine for simultaneously cutting a loaf of cheese into a multiplicity of thin slices. The loaf of cheese such as the loaf L may consist of a 5 lb. loaf which is approximately 12 inches long, and 3 to 3½ inches along each side. This is cut into 150 relatively thin slices without crumbling or breaking thereof.

The cutting machine includes a base 11 having legs 12 for supporting the machine for convenient use on a counter and the like. Arranged above the base 11 is a table 13 for supporting the loaf of cheese thereon. The table is affixed to upright members 14 rigidly carried by the base. A cutter head 16 is provided which consists of a rectangular frame 17 mounting a multiplicity of transversely extending longitudinally spaced cutter wires 18 which may be of any desired number such as the number required for cutting a 5 lb. loaf of cheese into 150 slices. The wires extend transversely of the open portion of the frame and as the frame is moved downwardly the wires cut through the loaf supported on the table. When the loaf is cut, the cut slices thereof project through the frame in upright relation on the table.

The head is moved downwardly by means of the manual turning of a hand wheel 19 affixed to a drive shaft 20 mounted in bearings 21 depending from the underside of the base and which operatively engage racks 22 by means of spur gears 23 mounted on the ends of a longitudinally extending shaft 24. The shaft 24 has a worm gear 25 mounted thereon which is in engagement with a worm 26 affixed to the inner end of the drive shaft 20. The shaft 24 is mounted in bearings 27 and in bearing brackets 28 which are affixed to and depending from the underside of the base. Affixed to said brackets 28 are gear boxes 29 disposed at the opposite ends of the base with the spur gears 23 arranged therein in meshing engagement with the racks 22 which are guidably slidable in the boxes and project through openings in the top and bottom thereof.

The head is pivoted on trunnions 30 extending through bearings in the upper ends of the racks with the inner ends of the trunnion threadedly engaged in threaded openings in end bars 31 affixed to the ends of the frame 17. The wires are mounted on longitudinally extending slide bars 32 which are slidable in recesses between the frame and the end bars. Longitudinally spaced screws 33 are mounted in openings in the frame for swivel turning movement with the inner ends of the screws threadedly engaging the slide bars for moving the bars outwardly for tightening the wires.

An important feature of the invention is the construction by which the wires move through the loaf of cheese into continuously changing angular relation from one inclined or canted relation with reference thereto to oppositely disposed inclined or canted relation and from said oppositely disposed inclined or canted relation to substantially horizontal relation. For this purpose, the table 13 is disposed with its longitudinal center line arranged forwardly of the longitudinal center line of the head which extends through the trunnion 30. Furthermore, the head is provided with a finger 35 which is pivoted on a pivot pin 36 to a slotted bracket 37 affixed to the underside of the frame 17 at the rear thereof with the finger depending normally above a block 38 affixed in upstanding relation on the base. The finger 35 and the slotted bracket 37 weight the rear portion of the frame so as to dispose the same in angular relation with reference to the loaf on the table. The head swings in continuously changing angular relation from the angular relation at the upper end of its stroke to oppositely disposed angular relation with the downward movement of the wires through the load. During this downward movement, the finger 35 engages the block 38 and when the head is moved to said oppositely disposed angular relation, the finger 35 moves out of engagement with the block 38 whereupon the head moves from said oppositely disposed angular relation to substantially horizontal relation at the bottom of the loaf of cheese. This movement of the head and wires through the loaf of cheese is illustrated schematically in FIGURES 5 to 9 inclusive of the drawings.

The finger 35 depends normally in vertical relation due to the weight thereof and is retained against inward swinging movement by a cross pin 40 located at the rear of the finger. When the head is moved to rearwardly inclined relation the pin 40 swings the finger outwardly to dispose the lower end thereof out of engagement with the block 38 so as to permit the head to swing from said rearwardly inclined relation to substantially horizontal relation.

Preferably a resilient pad 41 of sponge rubber or the like is affixed to the upper face of the table 13 whereby the wires resiliently engage in the pad in cutting through the bottom of the loaf.

The racks 22 are provided with horizontal shoulders 42 on the confronting faces thereof above the rack teeth and below the trunnions 30 which are engaged by the end bars 31 so as to limit the inclination of the head at the beginning of the downward movement thereof.

The wires 18 may be attached to the bars 32 in any desired manner and, as illustrated, the same are preferably fashioned of a single length of steel wire 43 or the like. The wire 43 is looped back and forth about pins 44 depending from the underside of the bars 32 with the ends of the wire 43 attached to screws 45 releasably secured to said bars to permit of the convenient removal of the wire for replacing the same. Preferably each of the trunnions 30 is provided with an enlarged head 46 to permit of the convenient unscrewing thereof for removing the head whenever necessary for replacing the wire.

In use the head is moved upwardly to a position in which the finger 35 is spaced from the block 38 and a loaf of cheese or the like is placed on the pad 41. Turning of the handle wheel to effect downward movement of the head causes the wires to cut through the cheese as hereinbefore described so as to simultaneously cut a multiplicity of thin slices without breaking or crumbling thereof which project through the head in upstanding relation on the pad so that the entire loaf of cut slices may be conveniently removed with the loaf still in its original form.

Figure 5:
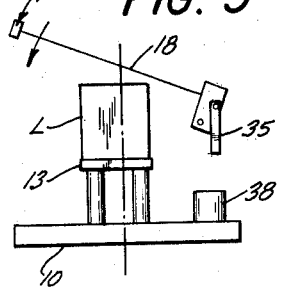
FIG. 5 is a schematic view showing the angular position of the head and cutter wires at the beginning of the downward movement thereof.
Figure 6:
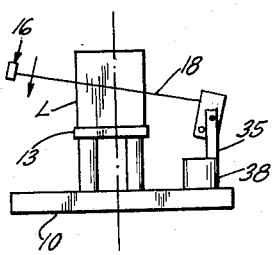
FIG. 6 is a similar view showing the angular position of the head and wires when the finger is moved into engagement with the upstanding block.
Figure 7:
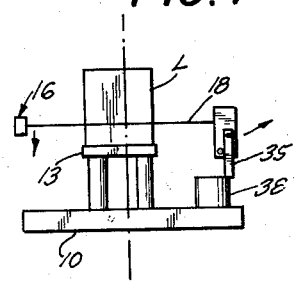
FIG. 7 is a view showing the swinging of the head and wires with the continued downward movement thereof.
Figure 8:
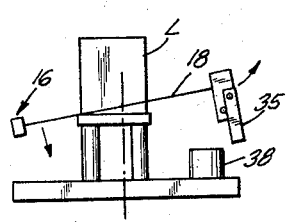
FIG. 8 is a view showing the movement of the head and wires to oppositely disposed angular relation.
Figure 9:
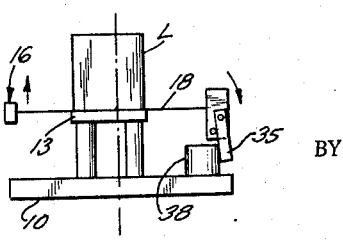
FIG. 9 is a view when the head and wires have cut the head of cheese into a multiplicity of slices arranged in upstanding relation on the table.

With the downward movement of the head 16 the cutting wires 18 in cutting through the loaf of cheese L move from the forwardly inclined relation shown in FIG. 5 of the drawings progressively to the substantially horizontal relation shown in FIG. 7 and thence to the oppositely inclined relation shown in FIG. 8 and from the said oppositely inclined relation to the substantially horizontal relation shown in FIG. 9 of the drawings.

While the preferred form of the invention is shown and described herein, it is to be understood that the same is not so limited but shall cover and include any and all modifications of the invention which fall within the purview thereof.

What is claimed is:

1. In a device of the character described, a base, a table, means securing said table on said base, a cutter head consisting of a frame having a multiplicity of wires arranged in a common plane and extending in one direction across said frame, means for moving said head for engagement of said wires through a loaf of food product supported on said table, said means including a rack pivotally connected with said head and carried by said base for guided reciprocatory movement, rotatable drive means operatively connected with said rack for moving said head downwardly with the turning of the drive means in one direction, and means carried by said head and base disposing said head and wires in angular relation with reference to the food product and effecting swinging of the head in continuously changing angular relation of the wires through the food product supported on said table with the downward movement of the head.

2. In a device of the character described, a base, a table, means securing said table on said base, a cutter head consisting of a frame having a multiplicity of wires arranged in a common plane and extending in one direction across said frame, means for moving said head for engagement of said wires through a loaf of food product supported on said table, said means including a rack pivotally connected with said head and carried by said base for guided reciprocatory movement, rotatable drive means operatively connected with said rack for moving said head downwardly with the turning of the drive means in one direction, means carried by said head disposing said head and wires in angular relation with reference to the food product, and means carried by said base adapted to be engaged by said last mentioned means during the downward movement of the head to limit the downward movement of the head at one side thereof whereby continued downward movement of the head effects swinging thereof in continuously changing angular relation of the wires into oppositely disposed angular relation as the wires cut through the food product supported on the table.

3. In a device of the character described as set forth in claim 2 wherein the cutter head and the wires are disposed in forwardly extending angular relation and move from said forwardly extending angular relation to rearwardly extending angular relation and from said rearwardly extending angular relation to substantially horizontal relation with the downward movement of the wires through the loaf of food product.

4. In a device of the character described as set forth in claim 3 wherein the table is disposed with the longitudinal center line thereof spaced slightly forwardly of the longitudinal center line of the head which extends through the pivotal connection of the head with the racks.

5. In a device of the character described as set forth in claim 4 wherein the racks are provided with shoulders which limit the inclination of the head with reference to the food product.

6. In a device of the character described, a base, a table, means securing said table on said base, a cutter head consisting of a frame having a multiplicity of wires arranged in a common plane and extending in one direction across said frame, means for moving said head for engagement of said wires through a loaf of food product supported on said table, said means including a rack pivotally connected with said head and carried by said base for guided reciprocatory movement, rotatable drive means operatively connected with said rack for moving said head downwardly with the turning of the drive means in one direction, said table being weighted at its rear side normally disposing said head and wires in forwardly inclined angular relation with reference to the food product, said head having a depending finger pivotally connected therewith, an upstanding stop member carried by said base arranged below said finger, said table being disposed with the longitudinal center line thereof spaced slightly forwardly of the longitudinal center line of the head, whereby with the downward movement of the head into engagement of the wires with the food product the head turns on its pivotal connection with the racks from said forwardly inclined angular relation into continuously changing forwardly inclined angular relation as the wires cut through the product until said finger engages said stop member to thereby limit the downward movement of the head at one side whereupon the head swings on said pivotal connection into oppositely disposed angular relation as the wires continue to cut through the product with the continued downward movement of the head, and said head having means adapted to engage said finger to move said finger out of engagement with said upstanding stop member when said head is moved to said oppositely disposed angular relation whereupon said head swings into substantially horizontal relation to thereby complete the cutting of the wires through the product with the completion of the downward movement of the head.

References Cited in the file of this patent

UNITED STATES PATENTS

| | | |
|---|---|---|
| 657,227 | Stewart | Sept. 4, 1900 |
| 899,533 | Hodell | Sept. 29, 1908 |
| 2,339,722 | Ricksham | Jan. 18, 1944 |